United States Patent
Anchor et al.

(10) Patent No.: US 6,669,984 B2
(45) Date of Patent: Dec. 30, 2003

(54) POWDER-BASED COATING COMPOSITION, A CURED FILM THEREOF, AND A METHOD OF IMPROVING A COLOR STRENGTH OF THE CURED FILM

(75) Inventors: Michael J. Anchor, Canton, MI (US); William H. Alford, Livonia, MI (US); Gregory W. Drewno, Riverview, MI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/970,959

(22) Filed: Oct. 4, 2001

(65) Prior Publication Data

US 2003/0100646 A1 May 29, 2003

(51) Int. Cl.[7] ................................. B05D 5/06
(52) U.S. Cl. ....................... 427/189; 427/195
(58) Field of Search ................. 427/180, 189, 427/195

(56) References Cited

U.S. PATENT DOCUMENTS

| | | | |
|---|---|---|---|
| 4,320,048 A | 3/1982 | Harmuth | 523/333 |
| 5,326,516 A | 7/1994 | Brannon | 264/143 |
| 5,379,947 A | 1/1995 | Williams et al. | 241/21 |
| 5,552,487 A | 9/1996 | Clark et al. | 525/131 |
| 5,569,539 A | 10/1996 | Avar et al. | 428/457 |
| 5,973,032 A | 10/1999 | Caswell et al. | 523/351 |
| 6,117,606 A | 9/2000 | Macholdt et al. | 430/106 |
| 6,160,037 A | 12/2000 | Leugs et al. | 523/205 |
| 6,232,371 B1 | 5/2001 | Caswell et al. | 523/205 |
| 6,251,553 B1 | 6/2001 | Baur et al. | 430/106 |
| 6,288,162 B2 | 9/2001 | Leugs et al. | 524/560 |

FOREIGN PATENT DOCUMENTS

| | | |
|---|---|---|
| DE | 100 27 295 | 12/2001 |
| EP | 459048 | * 12/1991 |
| EP | 936 251 | 2/1999 |
| WO | WO 9531507 | 11/1995 |

OTHER PUBLICATIONS

DATABASE WPI Section Ch., Week 197937, Derwent Publications Ltd., London, GB Class A23, 1979–66742B, 1979.
English Language Abstract for DE10027295, Dec. 2001.
English Language Abstract for WO200053685A1, Sep. 2000.
English Language Abstract for EP372860–A, Jun. 1990.
English Language Abstract for NL1005097C2, Jul. 1998.
English Language Abstract for WO99/16810, Apr. 1999.
English Language Abstract for DE19705962–A1, Aug. 1998.
Krendilinger, E., et al., Less is something more–Waxes as additives for powder coatings, JOT Jun. 2000.

* cited by examiner

Primary Examiner—Erma Cameron

(57) ABSTRACT

The present invention is directed to a powder coating composition and a method. The method improves the color strength of a cured film of the powder-based coating composition. To produce the powder-based coating composition, the method begins by combining a powder-based binder, specifically a resin and a cross-linking agent, with a pigment and a surfactant to form a mixture. The mixture is then extruded thereby forming an extrudate of the mixture. The extrudate is cooled and then ground to produce the powder-based coating composition from the extrudate of the mixture. Next, the powder-based coating composition is spray applied to a substrate and cured to form the cured film. The surfactant in the mixture improves the color strength of the powder-based coating composition and the cured film so that the amount of pigment included in the mixture can ultimately be reduced. Additionally, certain physical properties of the cured film are not compromised.

39 Claims, No Drawings

POWDER-BASED COATING COMPOSITION, A CURED FILM THEREOF, AND A METHOD OF IMPROVING A COLOR STRENGTH OF THE CURED FILM

FIELD OF THE INVENTION

The subject invention generally relates to a powder-based coating composition, a cured film of the powder-based coating composition, and a method of improving a color strength of the cured film. More specifically, the subject invention relates to an extruded powder-based coating composition, and a method of improving the color strength of a cured film of the powder-based coating composition, that combine a surface-active agent with a powder-based binder and a pigment to improve the color strength such that the amount of pigment that is used can be reduced.

BACKGROUND OF THE INVENTION

Powder-based coating compositions are known in the art. Conventional powder-based coating compositions typically combine a powder-based binder and a pigment to form a mixture. The mixture is then extruded to form an extrudate that is cooled and ground to form the conventional powder-based coating compositions that are applied to, and cured on, a substrate to form a cured film for both aesthetic and functional purposes.

In the prior art, during the combination of the powder-based binder and the pigment to form the mixture and also during the extrusion of the mixture, it is commonplace that the pigment is not efficiently 'wetted' and not uniformly dispersed throughout the mixture and throughout the powder-based coating composition. As a result, to achieve suitable color strength for both the aesthetic and functional purposes, it is necessary that these conventional powder-based coating compositions include excessive amounts of the pigment for combination with the powder-based binder.

As understood throughout the art, an excessive amount of pigment in powder-based coating compositions is very problematic. For instance, the pigment is frequently the most expensive component of the powder-based coating composition. As a result, an excessive amount of pigment drives the cost of the powder-based coating composition upward which is undesirable. Furthermore, an excessive amount of pigment contributes to difficulties in applying the powder-based coating composition to the substrate and also leads directly to poor appearance of the cured film. Finally, without the excessive amount of pigment, the powder-based coating compositions of the prior art are unable to achieve color strengths that are suitable across the various industries.

Due to the inadequacies of the powder-based coating compositions of the prior art, it is desirable to provide a unique and novel powder-based coating composition and method that improve a color strength of a cured film.

SUMMARY OF THE INVENTION

A powder-based coating composition and a method of improving a color strength of a cured film of the powder-based coating composition are disclosed. The method includes the step of combining at least a powder-based binder, a pigment, and a surface-active agent to form a mixture. The mixture is then extruded to form an extrudate of the mixture. The powder-based coating composition is then produced from the extrudate of the mixture. After the powder-based coating composition is produced from the extrudate, the composition is applied to a substrate. Finally, the powder-based coating composition is cured to form the cured film. The surface-active agent in the mixture that is extruded improves the color strength of the powder-based coating composition and the cured film without detrimental effects to the physical properties of the cured film.

Accordingly, the subject invention provides a unique and novel powder-based coating composition and method that utilize a surface-active agent in the powder-based coating composition to affect the pigment and improve the color strength of the cured film of the powder-based coating composition produced according to the method.

DETAILED DESCRIPTION OF THE INVENTION

A method of improving a color strength of a cured film of a powder-based coating composition is disclosed. The method of the subject invention includes the step of combining at least a powder-based binder, a pigment, and a surface-active agent to form a mixture. The mixture is then extruded to form an extrudate of the mixture, and then the powder-based coating composition of the subject invention is produced from the extrudate of the mixture. The step of extruding the mixture into the extrudate, and the step of producing the powder-based coating composition from the extrudate will be described in detail below.

After combination, the mixture includes from 45 to 99, preferably from 60 to 70, parts by weight of the powder-based binder based on 100 parts by weight of the mixture. The powder-based binder in the mixture more specifically includes a resin, having a functional group, and a cross-linking agent. The cross-linking agent is reactive with the functional group of the resin.

The resin of the powder-based binder is preferably selected from the group consisting of acrylic resins, epoxy resins, phenolic resins, polyester resins, urethane resins, and combinations thereof. Furthermore, the mixture includes from 45 to 75, preferably from 55 to 65, parts by weight of the resin based on 100 parts by weight of the mixture. The functional groups of the preferred resins set forth above include, but are not limited to, epoxy functional groups, carboxy functional groups, hydroxy functional groups, and combinations thereof. The most preferred resin of the powder-based binder is a carboxylated polyester resin. One suitable carboxylated polyester resin is commercially available as Uralac® P 3400 from DSM Engineering Plastic Products, Reading, Pa. An alternative carboxylated polyester resin suitable for the resin of the powder-based binder is commercially available as Uralac® P 5998 also from DSM Engineering Plastic Products.

The cross-linking agent that is reactive with the functional group of the resin is preferably selected from the group consisting of aminoplasts, blocked isocyanates, polycarboxylic acids, acid anhydrides, polyamines, polyphenols, epoxy resins, and combinations thereof. Furthermore, the mixture includes from 0.5 to 25.0, preferably from 1 to 15, parts by weight of the cross-linking agent based on 100 parts by weight of the mixture. The most preferred cross-linking agent of the powder-based binder is triglycidyl isocyanurate (TGIC). One suitable TGIC is commercially available as Araldite® PT 810 from Vantico, Brewster, N.Y. Alternatively, if the cross-linking agent is the epoxy resin, then one suitable epoxy resin is commercially available as Araldite® GT 7013 from Vantico, Brewster, N.Y.

The pigment is combined with the powder-based binder and the surface-active agent to form the mixture. Depending on the particular embodiment, the pigment may include an inorganic pigment, an organic pigment, or both. Generally, the mixture includes from 1 to 50, preferably from 30 to 40, parts by weight of the pigment based on 100 parts by weight of the mixture. Carbon black pigment may be used. Other pigments, both inorganic and organic, may also be combined to form the mixture. Suitable inorganic pigments that may be combined to form the mixture include, but are not limited to, titanium dioxide pigment, zinc oxide, zinc sulfide, barium sulfate, inorganic colored pigments, such as iron oxide (red, black, brown, and yellow), chrome yellow, moly orange, titanium yellow, nickel titanate yellow, chrome greens such as chromium oxide green, ferric ferrocyanide, lead chromate, and the like. The most preferred organic pigments are selected from the group consisting of phthalocyanine-based green pigment, phthalocyanine-based blue pigment, and combinations thereof. Other organic pigments may be included. Other suitable organic pigments that may be combined to form the mixture include, but are not limited to, metallized and non-metallized azo pigments such as cromophthal pigments, azomethine pigments, methine pigments, anthraquinone pigments, perinone pigments, perylene pigments, diketopyrrolopyrrole pigments, thioindigo pigments, iminoisoindoline pigments, isoindolinone pigments, iminoisoindolinone pigments, quinacridone pigments such as quinacridone reds and violets, flavanthrone pigments, indanthrone pigments, perinone pigments, anthrapyrimidine pigments, carbazole pigments, monoarylide and diarylide yellows, benzimidazolone yellows, tolyl orange, naphthol orange, irgazine orange, and quinophthalone pigments.

With the exception of 'masstone' powder-based coating compositions, most powder-based coating compositions utilize a combination of inorganic titanium dioxide pigment for white and some other colored pigment or pigments, either organic or inorganic. The mixtures of these powder-based coating compositions preferably include from 25 to 45, more preferably from 30 to 40, parts by weight of titanium dioxide pigment based on 100 parts by weight of the mixture, and from 0.1 to 10, preferably from 0.1 to 1.0, parts by weight of the organic pigment based on 100 parts by weight of the mixture. It is to be understood that any combination of pigments may be utilized in the mixture without varying the scope of the subject invention. It is also to be understood that other 'effect-type' pigments may be combined with the powder-based binder and the surface-active agent to form the mixture. These 'effect-type' pigments include, without limitation, aluminum and mica flaked pigments, color-variable pigments such as coated aluminum flakes, fluorescent and phosphorescent pigments, and reflective and retroreflective microspheres.

One embodiment of the subject invention utilizes an inorganic titanium dioxide pigment and a phthalocyanine blue pigment. Specific examples of these pigments include Ti-Pure® R-706 (TiO$_2$) commercially available from Dupont, Wilmington, Del. and Heliogen® Blue L 6930 commercially available from BASF Corporation, Mt. Olive, N.J.

The surface-active agent is combined with the powder-based binder and the pigment to form the mixture. For purposes of the subject invention, the surface-active agent, hereinafter described as a surfactant, is intended to include any compound that reduces surface tension when dissolved in water or a water solution, or which reduces interfacial tension between two liquids, or between a liquid and a solid. The surfactant uutilized may be a liquid or a solid. The surfactants of the subject invention promote efficient 'wetting' and uniform dispersibility of the pigments included in the mixture and the powder-based coating composition. As a result, the color strength of the cured film is improved, and an amount of the pigment included in the mixture can be reduced in response to this improved color strength.

The surfactant is present in the mixture in an amount from 0.1 to 0.5, preferably from 0.2 to 0.4, parts by weight surface-active agent based on 100 parts by weight of the mixture. The surfactant present in the mixture may include at least one of a nonionic surfactant, an anionic surfactant, and a cationic surfactant. As a result, the surfactant present in the mixture may include combinations of the nonionic surfactant, the anionic surfactant, and the cationic surfactant. The surfactant combined to form the mixture has, in certain embodiments, a surface tension of from 20 to 50, preferably from 30 to 45, dynes/cm at 0.1% concentration, by weight, and 25° C. Furthermore, in any embodiment of the subject invention, the surfactant has a hydrophilic-lipophilic balance (HLB) of from 1 to 20, preferably from 4 to 17. It is known in the art that the HLB can be determined according to several different methods. For example, in addition to known equations utilized to calculate the HLB, one method of determining the HLB includes an experimental method where the HLB of a particular surfactant is arrived at by blending the unknown surfactant with a surfactant having a known HLB, and then using the blend to emulsify an oil for which the HLB required to emulsify the oil is known. The HLB can also be experimentally estimated by evaluation of the water solubility of the surfactant. Finally, the HLB can also be determined by the method of W. C. Griffin as is known in the art, and can be calculated from GLC relative retention ratios as is known in the art.

The preferred surfactant is a nonionic surfactant including at least one of an alkylphenol alkoxylate, an alcohol alkoxylate, a block copolymer of ethylene oxide and propylene oxide, and a sorbitan fatty acid ester. The alcohol alkoxylates preferably include an alcohol chain having from 1 to 25 carbon atoms. Further, the alcohol alkoxylates are preferably selected from the group consisting of tridecyl alcohol ethoxylates, lauryl alcohol ethoxylates, cetostearyl alcohol ethoxylates, and combinations thereof. Cetostearyl alcohol, also known in the art as cetearyl alcohol, is generally a mixture of fatty alcohols having, predominantly, cetyl alcohol, $CH_3(CH_2)_{14}CH_2OH$, and stearyl alcohol, $CH_3(CH_2)_{16}CH_2OH$. The block copolymers of ethylene oxide and propylene oxide preferably include amine-based block copolymers. These amine-based block copolymers are further defined as amine-based, tetra-functional, block copolymers derived from the addition of ethylene oxide and propylene oxide to ethylenediamine. The sorbitan fatty acid esters are preferably selected from the group consisting of sorbitan monolaurate, sorbitan trioleate, sorbitan monooleate, sorbitan monostearate, sorbitan monopalmitate, sorbitan tristearate, and combinations thereof.

More specific examples of other suitable nonionic surfactants include nonyl phenol ethoxylate, polyoxyethylene lauryl ether, polyoxyethylene octylphenyl ether, polyoxyethylene oleylphenyl ether, polyoxyethylene nonylphenyl ether, oxyethylene-oxypropylene block copolymer, tert-octylphenoxyethylpoly-(39)-ethoxyethanol, nonylphenoxyethylpoly-(40)-ethoxyethanol, and the like.

As set forth above, the surfactant of the subject invention may also include anionic and cationic surfactants, utilized singly or in combination. Specific examples of suitable anionic surfactants include sodium dodecylbenzenesulfonate (DBS, SDS), sodium lauryl sulfate (SLS), sodium alkyldiphenyletherdisulfonate, sodium alkylnaphthalenesulfonate, sodium dialkylsulfosuccinate, sodium stearate, potassium oleate, sodium dioctylsulfosuccinate, sodium polyoxyethylenealkylethersulfate, sodium polyoxyethylenealkylphenylethersulfate, sodium dialkylsulfosuccinate, sodium oleate, sodium tertoctylphenoxyethoxypoly-(40)-ethoxyethylsulfate, monoester sulfosuccinates, diester sulfosuccinates, nonyl phenol ether sulfates, sodium dioctyl sulfosuccinate, sodium bistridecyl sulfosuccinate, sodium dihexyl sulfosuccinate, sodium dicyclohexyl sulfosuccinate, sodium diamyl sulfosuccinate, sodium diisobutyl sulfosuccinate, disodium ethoxylated alcohol half ester of sulfosuccinic acid, disodium ethoxylated nonyl phenol half ester of sulfosuccinic acid, disodium isodecyl sulfosuccinate ammonium salt of sulfated nonylphenoxy poly(ethyleneoxy) ethanol having various degrees of ethoxylation, and the like.

Specific examples of suitable cationic surfactants include lauryltrimethylammonium chloride, stearyltrimethylammonium chloride, and the like. The surfactant may also be a reactive surfactant such as sodium vinyl sulfonate, maleic acid half-ester of monomethylether of polyethylene glycol, maleic acid diester of monomethylether of polyethylene glycol, and the like.

A suitable alkylphenol alkoxylate surfactant is commercially available as Iconol® WA-1 from BASF Corporation, Southfield, Mich. Suitable alcohol alkoxylate surfactants are commercially available as Iconol® TDA-3, Iconol® TDA-9, Macol® LA 23, and Macol® CSA 20, all from BASF Corporation, Southfield, Mich. Suitable surfactants that are block copolymers of ethylene oxide and propylene oxide are commercially available as Tetronic® 704, Tetronic® 904, and Pluronic® P-85, all from BASF Corporation, Southfield, Mich. Suitable sorbitan fatty acid ester surfactants are commercially available as T-Maz® 20, T-Maz® 85 K, T-Maz® 85 KLM, T-Maz® 85 SP, S-Maz® 20 M1, and S-Maz® 85 SP, all from BASF Corporation, Southfield, Mich. Finally, other suitable surfactants that are commercially available from BASF Corporation, Southfield, Mich. include, but are not limited to, Masil® SF 19 and Poly-G® 1000.

The HLB of Iconol® WA-1 is 13, the HLB of Iconol® TDA-3 is 8, the HLB of Iconol® TDA-9 is 13, the HLB of Macol® LA 23 is 16.4, the HLB of Tetronic® 704 is 15, the HLB of Tetronic® 904 is 15, the HLB of Pluronic® P-85 is 16, the HLB of T-Maz® 20 is 16.7, the HLB of T-Maz® 85 K is 11.1, the HLB of T-Maz® 85 KLM is 11, the HLB of T-Maz® 85 SP is 11, the HLB of S-Maz® 20 M1 is 8, and the HLB of S-Maz® 85 SP is 2.1.

The method of the subject invention optionally includes the step of combining a flow control agent with the powder-based binder, the pigment, and the surfactant to form the mixture. As understood by those skilled in the art, the flow control agent improves certain properties of the cured film of the powder-based coating composition, such as enhancing resistance of the cured film to 'pin-hole' and crater defects upon application and cure. Preferably, the flow control agent is an acrylic flow control agent and is present in the mixture in an amount from 0.1 to 5.0, more preferably from 0.6 to 1.0, parts by weight of the flow control agent based on 100 parts by weight of the mixture. One suitable flow control agent is commercially available as Resiflow™ PL 200 from Estron Chemical, Inc., Calvert City, Ky.

To make the mixture and the powder-based coating composition of the subject invention, the powder-based binder, the pigment, the surfactant, and optionally the flow control agent (the "components"), are combined to form the mixture. More specifically, the components are weight and added into a loading bucket, preferably a lint-free paper loading bucket, and the components are then mixed or blended in the loading bucket. Preferably, the mixture is agitated for at least 30 seconds at approximately 725 RPM on a Premier or Omega mixer, and the like.

The mixture is then extruded to form an extrudate of the mixture. In the preferred method, the mixture is top-loaded into a feed hopper where the mixture is metered into the extruder. The preferred extruder has 30 mm twin screws (external diameter) that are used to melt blend the mixture at approximately 107° C. Of course, it is to be understood that, for production purposed, the external diameter of the screws, twin or other, may vary between 70 and 100 mm. The temperatures utilized throughout the extruder may vary according to, among other considerations, the selected resin and cross-linking agent. Generally, however, it is understood that the mixture is extruded at a temperature above the melt temperature of the components of the mixture but below the cure, or cross-linking, temperature of the components of the mixture. The extruder preferably employs approximately a 200 RPM screw speed. Higher screw speeds may be employed for production purposes. Under such conditions, the mixture has a residence time in the extruder from 10 to 30, more specifically 20, seconds. Of course, the residence time of the mixture in the extruder may vary according to desired properties as is known in the art. In such applications, the extruder may employ blocks to regulate the residence time. Alternatively, the screw speed may be adjusted to regulate the residence time. Also, the extruder, which may include individual heating zones, may alternatively heat the mixture to varying temperatures as the mixture is processed through the extruder to form the extrudate.

After the extrudate is formed, the powder-based coating composition is produced from the extrudate. More specifically, the extrudate is passed over and through cooling rollers to cool the extrudate. Next, the cooled extrudate ground to form the powder-based coating composition, now a particulate blend of the components set forth above. Grinding the extrudate includes all known methods of grinding including, but not limited to, granulating, pulverizing, and pelletizing. Preferably, a Retsch 2M100 HK lab mill is used to grind the cooled extrudate. The ground extrudate is also filtered using, preferably, an ultrasonic sieve with a 120 mesh screen. After filtering, the extrudate has particle sizes of from 100 to 150, preferably 125, microns at a 99% cut ratio.

The powder-based coating composition of the subject invention is applied to a substrate, such as cold-rolled steel. It is to be understood that the particular substrate to which the powder-based coating composition is applied does not vary the scope of the subject invention. Preferably, the powder-based coating composition is spray applied by known spray techniques, such as electrostatic spraying, to a film build ranging from 2 to 3 mils. Of course, the film build of the powder-based coating composition varies depending on many factors including the type of substrate, cost, desired appearance, etc. After application to the substrate, the powder-based coating composition is cured to form the cured film. It is to be understood that the temperature and the duration of the cure of the powder-based coating composition vary according to the particular resins and cross-linking agents selected for the powder-based binder. In the most preferred embodiment, where the resin of the powder-based binder is a carboxylated polyester resin and the cross-linking agent of the powder-based binder is TGIC, the cure temperature is approximately 200° C. and the cure duration is at least 10 minutes at peak metal temperature (PMT), i.e., approximately 20 minutes.

As set forth above, the surface-active agent in the mixture improves the color strength of the powder-based coating composition and the cured film. More specifically, the color strength of the cured film of the powder-based coating composition is improved by from 5 to 25%, preferably from 11 to 19%, according to a spectrophotometer apparent color strength calculation. The spectrophotometer apparent color strength calculation is known in the art. The preferred spectrophotometer that is utilized to calculate the improved apparent color strength is commercially available as Model SP 68 from X-Rite, Inc., Grandville, Mich. It is to be understood that other spectrophotometers, preferably X-Rite, Inc. spectrophotometers, may be utilized to determine the improved apparent color strength of the cured film so long as the particular spectrophotometer calculates the improved color strength according to the apparent calculation as understood in the art. As set forth below in the Examples, the percentage basis for the improved color strength is determined by comparing the apparent color strength of the cured film of the powder-based coating composition produced in accordance with the subject invention, having surfactant, with the color strength of a cured film of a conventional powder-based coating composition, having no surfactant. Due to the inclusion of the surfactant in the powder-based coating composition, the color strength of the cured film is improved, and the amount of the pigment included in mixtures of the subject invention can be reduced in response to this improved color strength. More specifically, the surfactant functions primarily in the extruder during the melt blending of the components in the mixture to thoroughly and uniformly 'wet' and disperse the pigment or pigments such that the amount of the pigment can be reduced.

In an alternative embodiment of the subject invention, the surfactant is not combined with the other components of the mixture, i.e., the powder-based binder, the pigment, and optionally the flow control agent, until the mixture is metered into the extruder. In such an embodiment, the surfactant is simultaneously introduced into the extruder via a second feed hopper. In this embodiment, the surfactant is still melt blended with the other components of the mixture. In a further alternative embodiment, the surfactant is post-added to the extrudate, after the extrudate has been cooled and ground. That is, the surfactant is added to the powder-based coating composition which is formed of an extrudate having only the powder-based binder, the pigment, and optionally the flow control agent. In these alternative embodiments, the color strength of the cured film is improved to a lesser extent than that of the preferred embodiment, where the surfactant is combined and mixed to form the mixture. Instead, in these alternative embodiments, it is believed that the color strength of the cured film is only improved by from 1 to 5%, according to the spectrophotometer apparent color strength calculation.

The following examples illustrating the preparation of the mixture, of the powder-based coating composition, and of the cured film, and illustrating certain physical properties of the cured film, as presented herein, are intended to illustrate and not limit the invention.

EXAMPLES

The mixture was prepared by adding and reacting the following parts, by weight, unless otherwise indicated.

TABLE 1

| Mixture No. 1 Component | Detail | Amount (grams) |
| --- | --- | --- |
| Powder-Based Binder | | |
| Resin | Carboxylated Polyester [Uralac ® P 3400] | 59.52 |
| Cross-Linking Agent | Triglycidyl Isocyanurate (TGIC) [Araldite ® PT 810] | 4.50 |
| Pigment | | |
| White Pigment | Titanium Dioxide [Ti-Pure ® R-706] | 35.00 |
| Blue Pigment | Phthalocyanine Blue [Heliogen ® Blue L 6930] | 0.18 |
| Flow Control Agent | Acrylic Flow Control Agent [Resiflow ™ PL 200] | 0.80 |
| Surfactant | See Table 2 Below | — |
| | Total | 100.00 |

As set forth in Table 1, Mixture No. 1 is a pre-mix in that, for experimental convenience, the various surfactants were not yet combined to form the completed mixture. To prepare Mixture No. 1, 59.52 grams of the resin, 4.50 grams of the cross-linking agent, 35.00 grams of the white pigment, 0.18 grams of the blue pigment, and 0.80 grams of the flow control agent were combined. These components were weighed and added into a lint-free paper loading bucket. Next, Surfactant Nos. 1–15, as set forth below in Tables 2–8, were combined into the loading bucket with the mixture of the resin, the cross-linking agent, the pigments, and the flow control agent to form the complete mixture. The complete mixture was then agitated for 30 seconds at 725 RPM with a mixing blade.

The various Examples were then extruded to form the extrudates, and the powder-based coating compositions were formed as described above. Furthermore, the powder-based coating compositions were spray applied and cured to form the respective cured films as described above.

Physical property testing was conducted for each cured film. In particular, to evaluate a surface appearance of the cured film, 60° gloss was measured using a BYK-Gardner Micro-Gloss Meter. To evaluate a flow of the powder-based coating composition throughout the cure, which ultimately affects the surface appearance of the cured film, an Inclined Plate Flow, also referred to as Pill Flow, was measured according the PCI procedure known in the art. More specifically, the powder-based coating composition is cured on a steel panel that is set at a 65° angled incline for 15 minutes at 390° F. To evaluate an adhesion of the cured film to the substrate, a Gardner Cupping Test was conducted using Gardner Model 5400. As appreciated by those skilled in the art, the Gardner Cupping Test evaluates the adhesion of the cured film after indentation via a relatively slowly applied force. To evaluate flexibility, i.e., the bendability, of the cured film of the powder-based coating composition on the substrate, a Mandrel Bend Test was conducted. Furthermore, to evaluate impact resistance of the cured film of the powder-based coating composition, an Impact Test was conducted. For the Mandrel Bend Test and the Impact Test, "P" represents a passing, or acceptable, value, and "F" represents a failing, or unacceptable, value. Most importantly, the apparent color strength of each of the cured films was calculated as described above. The improved apparent color strength for each Example was determined by comparison to the apparent color strength of the Comparative Examples, i.e., the standard, which were 100. All of the physical property tests described above, the results of which are included in the following Tables, are recognized in the art. For the purposes of the present invention, the primary objective was to ensure that the physical property test results for each Example were comparable to the physical property test results for the Comparative Example. That is, the primary objective was to ensure that the physical properties of the cured films did not degrade due to the inclusion of the surfactant.

The results of the physical property testing as well as the particular surfactant used in the mixture are included in the Tables that follow.

TABLE 2

| Component | Detail | Comp. Ex. 1 Amount (grams) | Ex. 1A Amount (grams) | Ex. 1B Amount (grams) | Comp. Ex. 2 Amount (grams) | Ex. 2A Amount (grams) | Ex. 2B Amount (grams) |
|---|---|---|---|---|---|---|---|
| Mixture No. 1 | From Table 1 | 100.00 | 100.00 | 100.00 | 100.00 | 100.00 | 100.00 |
| Surfactant No. 1 | Iconol ® WA-1 | 0.00 | 0.25 | 0.50 | | | |
| Surfactant No. 2 | Iconol ® TDA-3 | | | | 0.00 | 0.50 | 1.00 |
| Color Strength | See Above | 100 | 115.2 | 107 | 100 | 113.7 | 116.7 |
| Gloss (60°) | See Above | 93.2 | 93.7 | 94.4 | 93.2 | 86.3 | 92.8 |
| Pill Flow | See Above | 95 | 88 | 85 | 95 | 70 | 73 |
| Gardner Cupping | See Above | 10.2 | 8.5 | 7.9 | 10.2 | 8.7 | 8.2 |
| Mandrel | See Above | P | F | F | P | F | F |
| Impact | See Above | P/160 | P/160 | P/160 | P/160 | P/160 | P/160 |

TABLE 3

| Component | Detail | Comp. Ex. 3 Amount (grams) | Ex. 3A Amount (grams) | Ex. 3B Amount (grams) | Comp. Ex. 4 Amount (grams) | Ex. 4A Amount (grams) | Ex. 4B Amount (grams) |
|---|---|---|---|---|---|---|---|
| Mixture No. 1 | From Table 1 | 100.00 | 100.00 | 100.00 | 100.00 | 100.00 | 100.00 |
| Surfactant No. 3 | Iconol ® TDA-9 | 0.00 | 0.25 | 0.50 | | | |
| Surfactant No. 4 | Macol ® LA 23 | | | | 0.00 | 0.50 | 1.00 |
| Color Strength | See Above | 100 | 111.3 | 115.1 | 100 | 108.1 | 114.7 |
| Gloss (60°) | See Above | 93.2 | 93.9 | 94.4 | 93.2 | 93.4 | 92.6 |
| Pill Flow | See Above | 95 | 73 | 84 | 95 | 79 | 74 |
| Gardner Cupping | See Above | 10.2 | 9.7 | 9.8 | 10.2 | 4.5 | 5.3 |
| Mandrel | See Above | P | P | P | P | P | F |
| Impact | See Above | P/160 | F/120 | F/100 | P/160 | F/80 | F/60 |

TABLE 4

| Component | Detail | Comp. Ex. 5 Amount (grams) | Ex. 5A Amount (grams) | Ex. 5B Amount (grams) | Comp. Ex. 6 Amount (grams) | Ex. 6A Amount (grams) | Ex. 6B Amount (grams) |
|---|---|---|---|---|---|---|---|
| Mixture No. 1 | From Table 1 | 100.00 | 100.00 | 100.00 | 100.00 | 100.00 | 100.00 |
| Surfactant No. 5 | Macol ® CSA 20 | 0.00 | 0.50 | 1.00 | | | |
| Surfactant No. 6 | Tetronic ® 704 | | | | 0.00 | 0.25 | 0.50 |
| Color Strength | See Above | 100 | 103.6 | 111.1 | 100 | 115.4 | 109.2 |

TABLE 4-continued

| Component | Detail | Comp. Ex. 5 Amount (grams) | Ex. 5A Amount (grams) | Ex. 5B Amount (grams) | Comp. Ex. 6 Amount (grams) | Ex. 6A Amount (grams) | Ex. 6B Amount (grams) |
|---|---|---|---|---|---|---|---|
| Gloss (60°) | See Above | 93.2 | 94.1 | 91.6 | 93.2 | 93.7 | 90.4 |
| Pill Flow | See Above | 95 | 74 | 74 | 95 | 80 | 70 |
| Gardner Cupping | See Above | 10.2 | 8.4 | 6.8 | 10.2 | 9.6 | 8.8 |
| Mandrel | See Above | P | P | F | P | P | P |
| Impact | See Above | P/160 | F/80 | F/60 | P/160 | P/160 | P/160 |

TABLE 5

| Component | Detail | Comp. Ex. 7 Amount (grams) | Ex. 7A Amount (grams) | Ex. 7B Amount (grams) | Comp. Ex. 8 Amount (grams) | Ex. 8A Amount (grams) | Ex. 8B Amount (grams) |
|---|---|---|---|---|---|---|---|
| Mixture No. 1 | From Table 1 | 100.00 | 100.00 | 100.00 | 100.00 | 100.00 | 100.00 |
| Surfactant No. 7 | Tetronic ® 904 | 0.00 | 0.25 | 0.50 | | | |
| Surfactant No. 8 | Pluronic ® P-85 | | | | 0.00 | 0.50 | 1.00 |
| Color Strength | See Above | 100 | 115.5 | 109.7 | 100 | 99.8 | 120.4 |
| Gloss (60°) | See Above | 93.2 | 94.1 | 93.2 | 93.2 | 92.1 | 92.9 |
| Pill Flow | See Above | 95 | 74 | 78 | 95 | 78 | 76 |
| Gardner Cupping | See Above | 10.2 | 9.6 | 8.2 | 10.2 | 10.1 | 8.7 |
| Mandrel | See Above | P | P | P | P | F | P |
| Impact | See Above | P/160 | P/160 | P/160 | P/160 | P/160 | F/120 |

TABLE 6

| Component | Detail | Comp. Ex. 9 Amount (grams) | Ex. 9A Amount (grams) | Ex. 9B Amount (grams) | Comp. Ex. 10 Amount (grams) | Ex. 10A Amount (grams) | Ex. 10B Amount (grams) |
|---|---|---|---|---|---|---|---|
| Mixture No. 1 | From Table 1 | 100.00 | 100.00 | 100.00 | 100.00 | 100.00 | 100.00 |
| Surfactant No. 9 | T-Maz ® 20 | 0.00 | 0.50 | 1.00 | | | |
| Surfactant No. 10 | Masil ® SF 19 | | | | 0.00 | 0.50 | 1.00 |
| Color Strength | See Above | 100 | 114.3 | 121.4 | 100 | 118.7 | 122.6 |
| Gloss (60°) | See Above | 93.2 | 90.6 | 91.6 | 93.2 | 91.6 | 89.2 |
| Pill Flow | See Above | 95 | 66 | 67 | 95 | 68 | 65 |
| Gardner Cupping | See Above | 10.2 | 7.8 | 5 | 10.2 | 7.2 | 6.7 |
| Mandrel | See Above | P | F | F | P | P | F |
| Impact | See Above | P/160 | F/80 | F/80 | P/160 | F/20 | F/40 |

TABLE 7

| Component | Detail | Comp. Ex. 11 Amount (grams) | Ex. 11A Amount (grams) | Ex. 11B Amount (grams) | Comp. Ex. 12 Amount (grams) | Ex. 12A Amount (grams) | Ex. 12B Amount (grams) |
|---|---|---|---|---|---|---|---|
| Mixture No. 1 | From Table 1 | 100.00 | 100.00 | 100.00 | 100.00 | 100.00 | 100.00 |
| Surfactant No. 11 | SLS | 0.00 | 0.25 | 0.50 | | | |
| Surfactant No. 12 | Poly-G ® 1000 | | | | 0.00 | 0.25 | 0.50 |
| Color Strength | See Above | 100 | 99.8 | 100.1 | 100 | 103.7 | 101.4 |
| Gloss (60°) | See Above | 93.2 | 94.2 | 92.8 | 93.2 | 91.6 | 92.3 |
| Pill Flow | See Above | 95 | 66 | 63 | 95 | 86 | 91 |
| Gardner Cupping | See Above | 10.2 | 8.8 | 7.6 | 10.2 | 8.6 | 8.5 |
| Mandrel | See Above | P | P | P | P | P | P |
| Impact | See Above | P/160 | P/160 | P/160 | P/160 | P/160 | P/160 |

TABLE 8

| Component | Detail | Comp. Ex. 13 Amount (grams) | Ex. 13A Amount (grams) | Comp. Ex. 14 Amount (grams) | Ex. 14A Amount (grams) | Comp. Ex. 15 Amount (grams) | Ex. 15A Amount (grams) |
|---|---|---|---|---|---|---|---|
| Mixture No. 1 | From Table 1 | 100.00 | 100.00 | 100.00 | 100.00 | 100.00 | 100.00 |
| Surfactant No. 13 | T-Maz ® 85 | 0.00 | 0.25 | | | | |
| Surfactant No. 14 | S-Maz ® 20 M1 | | | 0.00 | 0.25 | | |
| Surfactant No. 15 | S-Maz ® 85 SP | | | | | 0.00 | 0.25 |
| Color Strength | See Above | 100 | 115.1 | 100 | 117.2 | 100 | 114.1 |
| Gloss (60°) | See Above | 93.2 | 96.5 | 93.2 | 97.6 | 93.2 | 96.3 |
| Pill Flow | See Above | 95 | 73 | 95 | 84 | 95 | 82 |
| Gardner Cupping | See Above | 10.2 | 10 | 10.2 | 9.9 | 10.2 | 9.4 |
| Mandrel | See Above | P | P | P | P | P | P |
| Impact | See Above | P/160 | P/160 | P/160 | P/160 | P/160 | P/160 |

TABLE 9

| Component | Detail | Comp. Ex. 16 Amount (grams) | Ex. 16A Amount (grams) |
|---|---|---|---|
| Mixture No. 1 | From Table 1 | 100.00 | 100.00 |
| Surfactant No. 7 | Tetronic ® 904 | 0.00 | 0.25 |
| Pigment Concentration | | Std. | Std. (Less 15% by weight) |
| Color Strength | See Below | 100 | 105.8 |
| Gloss (60°) | See Above | 93.2 | 89.6 |
| Pill Flow | See Above | 95 | 85 |
| Gardner Cupping | See Above | 10.2 | 8.6 |
| Mandrel | See Above | P | P |
| Impact | See Above | P/160 | P/160 |

A summary of the color strengths achieved for the Examples associated with Mixture No. 1, and several of the surfactants, appears below in Table 10.

TABLE 10

COLOR STRENGTH SUMMARY
(for examples associated with Mixture No. 1)

| Component | Amount of Surfactant (Parts By Weight Based On 100 Parts By Weight Of Mixture No. 1) | Color Strength |
|---|---|---|
| Standard (No Surfactant) | N/A | 100 |

TABLE 10-continued

COLOR STRENGTH SUMMARY
(for examples associated with Mixture No. 1)

| Component | Amount of Surfactant (Parts By Weight Based On 100 Parts By Weight Of Mixture No. 1) | Color Strength |
|---|---|---|
| Surfactant No. 1 | 0.25 | 115.2 |
| Surfactant No. 3 | 0.25 | 111.3 |
| Surfactant No. 6 | 0.25 | 115.4 |
| Surfactant No. 7 | 0.25 | 115.5 |
| Surfactant No. 13 | 0.25 | 115.1 |
| Surfactant No. 14 | 0.25 | 117.2 |
| Surfactant No. 15 | 0.25 | 114.1 |

As Table 10 sets forth, the color strength of the cured film of the subject invention is improved by from 5 to 25%, preferably from 11 to 19%.

Mixture No. 1 was also modified by substituting different colored, i.e., non-white, pigments for the Heliogen® Blue L 6930. In one modification, an equivalent amount (0.18 grams) of phthalocyanine green pigment, commercially available as Heliogen® K 9360 from BASF Corporation, Southfield, Mich., was substituted for the Heliogen® Blue L 6930 in the original mixture as set forth above in Table 1. In another modification, an equivalent amount (0.18 grams) of an another phthalocyanine blue pigment, commercially available as Heliogen® K 7090 from BASF Corporation, Southfield, Mich., was substituted for the Heliogen® Blue L 6930 in the original mixture as set forth above in Table 1. The results for these modifications are set forth below in Table 11.

TABLE 11

| Component | Detail | Comp. Ex. 17 Amount (grams) | Ex. 17A Amount (grams) | Ex. 17B Amount (grams) | Comp. Ex. 18 Amount (grams) | Ex. 18A Amount (grams) | Ex. 18B Amount (grams) |
|---|---|---|---|---|---|---|---|
| Mixture | Similar To Mixture No. 1 (Table 1) | 100.00 | 100.00 | 100.00 | 100.00 | 100.00 | 100.00 |
| Substituted Pigment | Green Pigment Heliogen ® K 9360 | 0.18 | 0.18 | 0.18 | 0.00 | 0.00 | 0.00 |
| Substituted Pigment | Blue Pigment Heliogen ® K 7090 | 0.00 | 0.00 | 0.00 | 0.18 | 0.18 | 0.18 |
| Surfactant No. 6 | Tetronic ® 704 | 0.00 | 0.25 | 0.00 | 0.00 | 0.25 | 0.00 |
| Surfactant No. 14 | S-Maz ® 20 M1 | 0.00 | 0.00 | 0.25 | 0.00 | 0.00 | 0.25 |
| Color Strength | See Above | 100 | 150 | 136 | 100 | 101.2 | 101.4 |
| Gloss (60°) | See Above | 93.2 | 95 | 93 | 93.2 | 94 | 92.8 |
| Pill Flow | See Above | 95 | 83 | 86 | 95 | 80 | 82 |
| Gardner Cupping | See Above | 10.2 | 9 | 8.9 | 10.2 | 9.1 | 8.9 |
| Mandrel | See Above | P | P | P | P | P | P |
| Impact | See Above | P/160 | P/160 | P/160 | P/160 | P/160 | P/160 |

An alternative mixture, Mixture No. 2, was prepared by adding and reacting the following parts, by weight, unless otherwise indicated.

TABLE 12

| Mixture No. 2 Component | Detail | Amount (grams) |
|---|---|---|
| Powder-Based Binder | | |
| Resin | Carboxylated Polyester [Uralac ® P 5998] | 59.52 |
| Cross-Linking Agent | Epoxy Resin [Araldite ® GT 7013] | 4.50 |
| Pigment | | |
| White Pigment | Titanium Dioxide [Ti-Pure ® R-706] | 35.00 |
| Blue Pigment | Phthalocyanine Blue [Heliogen ® Blue L 6930] | 0.18 |
| Flow Control Agent | Acrylic Flow Control Agent [Resiflow ™ PL 200] | 0.80 |
| Surfactant | See Table 2 Below | — |
| | Total | 100.00 |

In Mixture No. 2, the resin and the cross-linking agent that were used for the powder-based binder were varied. Mixture No. 2 was otherwise prepared, extruded, and the powder-based coating compositions were produced, sprayed, and cured as described above with respect to Mixture No. 2.

A summary of the color strengths achieved for the Examples associated with Mixture No. 2, and several of the surfactants, appears below in Table 13.

Mt. Olive, N.J., was substituted for the Heliogen® Blue L 6930 in the original mixture as set forth above in Table 12. In another modification, an equivalent amount (0.18 grams) of an another phthalocyanine blue pigment, commercially available as Heliogen® K 7090 from BASF Corporation, Mt. Olive, N.J., was substituted for the Heliogen® Blue L 6930 in the original mixture as set forth above in Table 12. The results for these modifications are set forth below in Table 14.

TABLE 14

| Component | Detail | Comp. Ex. 19 Amount (grams) | Ex. 19A Amount (grams) | Ex. 19B Amount (grams) | Comp. Ex. 20 Amount (grams) | Ex. 20A Amount (grams) | Ex. 20B Amount (grams) |
|---|---|---|---|---|---|---|---|
| Mixture | Similar To Mixture No. 2 (Table 12) | 100.00 | 100.00 | 100.00 | 100.00 | 100.00 | 100.00 |
| Substituted Pigment | Green Pigment Heliogen® K 9360 | 0.18 | 0.18 | 0.18 | 0.00 | 0.00 | 0.00 |
| Substituted Pigment | Blue Pigment Heliogen® K 7090 | 0.00 | 0.00 | 0.00 | 0.18 | 0.18 | 0.18 |
| Surfactant No. 6 | Tetronic® 704 | 0.00 | 0.25 | 0.00 | 0.00 | 0.25 | 0.00 |
| Surfactant No. 14 | S-Maz® 20 M1 | 0.00 | 0.00 | 0.25 | 0.00 | 0.00 | 0.25 |
| Color Strength | See Above | 100 | 107.5 | 106.3 | 100 | 104 | 101 |
| Gloss (60°) | See Above | 96.9 | 96.7 | 95.8 | 96.9 | 95 | 96 |
| Pill Flow | See Above | 26 | 28 | 27 | 40 | 29 | 26 |
| Gardner Cupping | See Above | 9.1 | 9.0 | 8.9 | 10.2 | 9.1 | 8.8 |
| Mandrel | See Above | P | P | P | P | P | P |
| Impact | See Above | P/160 | P/160 | P/160 | P/160 | P/160 | P/160 |

TABLE 13

COLOR STRENGTH SUMMARY
(for examples associated with Mixture No. 2)

| Component | Amount of Surfactant (Parts By Weight Based On 100 Parts By Weight Of Mixture No. 2) | Color Strength |
|---|---|---|
| Standard (No Surfactant) | N/A | 100 |
| Surfactant No. 1 | 0.25 | 118.5 |
| Surfactant No. 3 | 0.25 | 113.0 |
| Surfactant No. 6 | 0.25 | 109.8 |
| Surfactant No. 7 | 0.25 | 111.0 |
| Surfactant No. 13 | 0.25 | 120.8 |
| Surfactant No. 14 | 0.25 | 121.0 |
| Surfactant No. 15 | 0.25 | 114.9 |

As Table 13 sets forth, the color strength of the cured film of the subject invention is improved by from 5 to 25%, preferably from 11 to 19%.

Mixture No. 2 was also modified by substituting different colored, i.e., non-white, pigments for the Heliogen® Blue L 6930. In one modification, an equivalent amount (0.18 grams) of phthalocyanine green pigment, commercially available as Heliogen® K 9360 from BASF Corporation, The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A method of improving a color strength of a cured film of a powder-based coating composition, said method comprising the steps of:
   (A) combining at least
      (i) a powder-based binder,
      (ii) a pigment, and
      (iii) a surface-active agent to form a mixture;
   (B) extruding the mixture to form an extrudate of the mixture;
   (C) producing the powder-based coating composition from the extrudate of the mixture;
   (D) applying the powder-based coating composition to a substrate; and
   (E) curing the powder-based coating composition to form the cured film wherein the surface-active agent in the mixture improves the color strength of the powder-based coating composition and the cured film.

2. A method as set forth in claim 1 wherein the surface-active agent has a hydrophilic-lipophilic balance of from 1 to 20.

3. A method as set forth in claim 1 wherein the surface-active agent has a hydrophilic-lipophilic balance of from 4 to 17.

4. A method as set forth in claim 1 wherein the surface-active agent comprises at least one of a nonionic surface-active agent, an anionic surface-active agent, and a cationic surface-active agent.

5. A method as set forth in claim 1 wherein the surface-active agent is a nonionic surface-active agent comprising at least one of an alkylphenol alkoxylate, an alcohol alkoxylate, a block copolymer of ethylene oxide and propylene oxide, and a sorbitan fatty acid ester.

6. A method as set forth in claim 1 wherein the surface-active agent comprises a nonionic surface-active agent.

7. A method as set forth in claim 6 wherein the non-ionic surface-active agent is selected from the group consisting of alkylphenol alkoxylates, alcohol alkoxylates, block copolymers of ethylene oxide and propylene oxide, sorbitan fatty acid esters, and combinations thereof.

8. A method as set forth in claim 7 wherein the alcohol chains of the alcohol alkoxylates have from 1 to 25 carbon atoms.

9. A method as set forth in claim 7 wherein the alcohol alkoxylates are selected from the group consisting of tridecyl alcohol ethoxylates, lauryl alcohol ethoxylates, cetostearyl alcohol ethoxylates, and combinations thereof.

10. A method as set forth in claim 7 wherein the block copolymers of ethylene oxide and propylene oxide comprise amine-based block copolymers.

11. A method as set forth in claim 10 wherein the amine-based block copolymers are further defined as amine-based, tetra-functional, block copolymers derived from the addition of ethylene oxide and propylene oxide to ethylenediamine.

12. A method as set forth in claim 7 wherein the sorbitan fatty acid esters are selected from the group consisting of sorbitan monolaurate, sorbitan trioleate, sorbitan monooleate, sorbitan monostearate, sorbitan monopalmitate, sorbitan tristearate, and combinations thereof.

13. A method as set forth in claim 1 wherein the mixture comprises from 0.1 to 0.5 parts by weight of the surface-active agent based on 100 parts by weight of the mixture.

14. A method as set forth in claim 1 wherein the mixture comprises from 0.2 to 0.4 parts by weight of the surface-active agent based on 100 parts by weight of the mixture.

15. A method as set forth in claim 1 wherein the surface-active agent has a surface tension of from 20 to 50 dynes/cm at 0.1% concentration, by weight, and 25° C.

16. A method as set forth in claim 1 wherein the mixture comprises from 45 to 99 parts by weight of the powder-based binder based on 100 parts by weight of the mixture.

17. A method as set forth in claim 1 wherein the powder-based binder in the mixture comprises a resin, having a functional group, and a cross-linking agent reactive with the functional group of the resin.

18. A method as set forth in claim 17 wherein the mixture comprises from 45 to 75 parts by weight of the resin based on 100 parts by weight of the mixture.

19. A method as set forth in claim 17 wherein the mixture comprises from 0.5 to 25.0 parts by weight of the cross-linking agent based on 100 parts by weight of the mixture.

20. A method as set forth in claim 17 wherein the resin of the powder-based binder is selected from the group consisting of acrylic resins, epoxy resins, phenolic resins, polyester resins, urethane resins, and combinations thereof.

21. A method as set forth in claim 17 wherein the functional group of the resin is selected from the group consisting of epoxy functional groups, carboxy functional groups, hydroxy functional groups, and combinations thereof.

22. A method as set forth in claim 17 wherein the cross-linking agent of the powder-based binder is selected from the group consisting of aminoplasts, blocked isocyanates, polycarboxylic acids, acid anhydrides, polyamines, polyphenols, epoxy resins, and combinations thereof.

23. A method as set forth in claim 1 wherein the mixture comprises from 1 to 50 parts by weight of the pigment based on 100 parts by weight of the mixture.

24. A method as set forth in claim 1 wherein the pigment comprises at least one of an inorganic pigment and an organic pigment.

25. A method as set forth in claim 1 wherein the pigment comprises titanium dioxide pigment.

26. A method as set forth in claim 1 wherein the pigment comprises an organic pigment.

27. A method as set forth in claim 26 wherein the mixture comprises from 0.1 to 10 parts by weight of the organic pigment based on 100 parts by weight of the mixture.

28. A method as set forth in claim 26 wherein the organic pigment is selected from the group consisting of phthalocyanine-based green pigment, phthalocyanine-based blue pigment, and combinations thereof.

29. A method as set forth in claim 1 further comprising the step of combining a flow control agent with the powder-based binder, the pigment, and the surface-active agent to form the mixture.

30. A method as set forth in claim 29 wherein the flow control agent is further defined as an acrylic flow control agent.

31. A method as set forth in claim 29 wherein the mixture comprises from 0.1 to 5.0 parts by weight of the flow control agent based on 100 parts by weight of the mixture.

32. A method as set forth in claim 1 wherein the color strength of the cured film of the powder-based coating composition is improved by from 5 to 25% according to a spectrophotometer apparent color strength calculation.

33. A method as set forth in claim 1 wherein the step of producing the powder-based coating composition from the extrudate of the mixture further comprises the step of cooling the extrudate of the mixture after the mixture has been extruded.

34. A method as set forth in claim 33 wherein the step of producing the powder-based coating composition from the extrudate of the mixture further comprises the step of grinding the extrudate of the mixture after the extrudate has been cooled.

35. A method as set forth in claim 1 further comprising the step of reducing an amount of the pigment included in the mixture in response to the improved color strength.

36. A method as set forth in claim 1 wherein the step of (A) combining at least (i) the powder-based binder, (ii) the pigment, and (iii) the surface-active agent to form the mixture is further defined as combining at least (i) a powder-based binder, (ii) a pigment, and (iii) a surface-active agent in a single step to form a mixture.

37. A method as set forth in claim 1 wherein the mixture consists essentially of (i) the powder-based binder, (ii) the pigment, and (iii) the surface-active agent.

38. A method as set forth in claim 1 wherein (ii) the pigment is free of additional binder prior to combination to form the mixture.

39. A method as set forth in claim 1 wherein (ii) the pigment is free of additional surface-active agent prior to combination to form the mixture.

* * * * *